United States Patent [19]

Bramow et al.

[11] 4,325,427
[45] Apr. 20, 1982

[54] DUAL THERMOSTAT CONTROL APPARATUS WITH DEAD BAND RESPONSE

[75] Inventors: Scott B. Bramow, Oak Creek; Thomas M. Holloway, Mukwonago, both of Wis.

[73] Assignee: Johnson Controls, Inc., Milwaukee, Wis.

[21] Appl. No.: 92,417

[22] Filed: Nov. 6, 1979

[51] Int. Cl.$^3$ .................. F25B 29/00; G05D 23/00
[52] U.S. Cl. ................................ 165/27; 165/32; 137/85; 236/1 R; 236/82
[58] Field of Search .................. 236/82, 86, 87, 1 C; 165/27, 14, 32, 40; 137/82, 85; 73/363.5

[56] References Cited

U.S. PATENT DOCUMENTS

| | | | |
|---|---|---|---|
| 3,115,039 | 12/1963 | Chapman | 73/363.5 |
| 3,140,047 | 7/1964 | Holloway | 236/82 |
| 3,212,710 | 10/1965 | Nilles | 236/87 |
| 3,305,172 | 2/1967 | Duchek et al. | 236/82 |
| 3,835,876 | 9/1974 | Laakaniemi et al. | 137/82 |
| 4,231,512 | 11/1980 | Johnson | 236/87 |
| 4,231,515 | 11/1980 | Ring | 236/87 |

*Primary Examiner*—Albert W. Davis
*Assistant Examiner*—Margaret A. Focarino
*Attorney, Agent, or Firm*—Andrus, Sceales, Starke & Sawall

[57] ABSTRACT

A dual thermostat apparatus includes two thermostats which generate fluid control signals proportional to room air temperature. The thermostats are matched leakport pressure sensors having a signal orifice and a bimetal lid element to generate back pressure signals linearly related to temperature. The bimetal elements have adjustment cams to set the reference position with respect to the orifice. The cams are connected to a common shaft and dial to provide simultaneous and opposite readjustment with respect to the reference pressures. The signals are applied to separate signal chambers of the duplex relay, with a pressure regulator connected to the heat signal chamber to limit the operative pressure level of the heating signal to a selected maximum switchover pressure. The duplex relay controls a pressure supply valve for supplying a proportional pressure signal to a common output line to pneumatic operators of a heating valve and a cooling valve. The regulator and duplex relay create a control in which the heat pressure signal operates to one side of said reference pressure and the cooling signal controls to the opposite side of such reference pressure. The position of the cams sets the required temperature related movement before the operative back pressure signal is established and thus defines a dead band region in which neither heating or cooling is provided. The signal switchover becomes operative only in accordance with the dead band setting and thus a range in which neither the heating valve or cooling is actuated to conserve energy.

18 Claims, 5 Drawing Figures

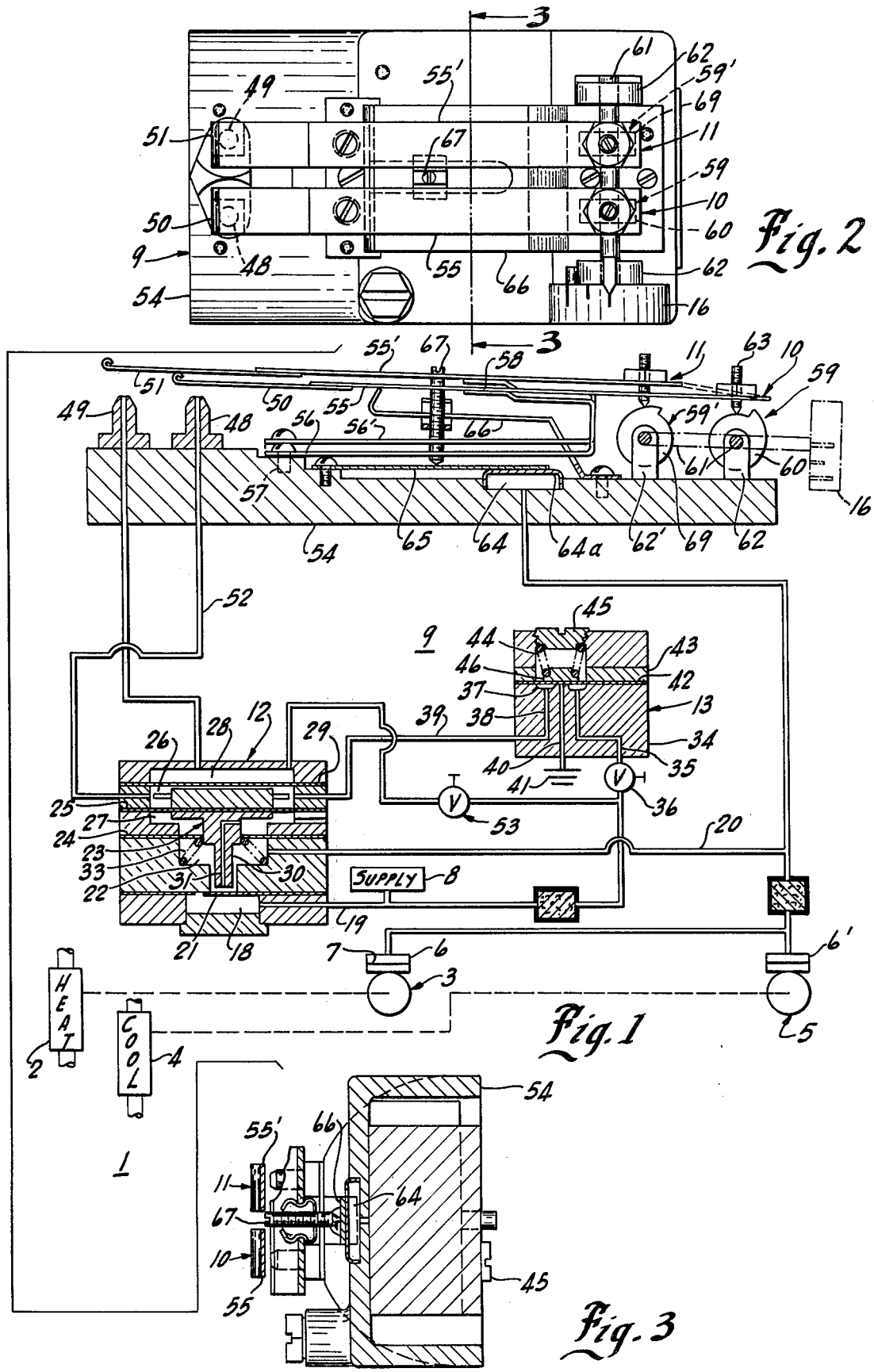

DUAL THERMOSTAT CONTROL APPARATUS WITH DEAD BAND RESPONSE

BACKGROUND OF THE INVENTION

This invention relates to a dual thermostat control apparatus for conditioning and maintaining environmental air in a predetermined condition.

The air supplied to a building or other enclosure is conventionally treated by a heating, ventilating and air conditioning system to create and maintain the air in a predetermined desired condition including a selected temperature. Normally, one or more thermostatic devices are mounted within the enclosed area or space to sense the temperature condition and to generate corresponding related demand signals. Various electrical and pneumatic thermostatic devices are commercially available to create the appropriate signal for connection as the input to a control system. A dual thermostatic unit may be provided to create a dual output, one of which controls a heat source for heating the air supplied to the conditioned space and a second of which controls a cooling source for cooling of the air to be supplied to the conditioned space. For example, U.S. Pat. No. 3,140,047 discloses a dual thermostatic device having a multiple supply pressure selector for changing over from a heating to a cooling condition. A pair of separate bimetal-leak port assemblies are provided to separately control the heating and the cooling. A duplex relay couples thermostatic fluid signals as the temperature related signals into the common control for operating a heating unit during the heating seasons and alternatively operating of a cooling unit during the air cooling seasons. A manual selector switch couples the proper supply to the thermostatic unit and provides for automatic actuation and setting of the relay system to respond to the appropriate heating or cooling thermostat. Although such a device provides an effective control, it does not provide an automatic switch-over condition nor does it provide for an interrelated limit control on the heating and cooling of the conditioned air to be supplied to the enclosed space. Other dual thermostat devices are shown, for example, in U.S. Pat. Nos. 3,115,039 and 3,166,085.

In various installations, the operator may desired, or may be required, to establish a predetermined maximum heated condition and a maximum cold or cooled condition in the conditioned space. The maximum condition may be the same or may provide a predetermined range over which heating and cooling may occur. Thus, a range would be created over which neither heating or cooling energy is supplied with a resulting energy conservation. The greater the non-operative or dead band range the greater the savings which will be obtained. For example, in an office environment, an apartment environment or the like, a set point temperature of 73° may be selected. If the system may be set to permit heating of the environmental space to some level below 73° and cooling to some level above 73° the necessary comfort condition may be provided at a minimal energy cost. This temperature differential or dead band region thus decreases the total energy consumption. The control system may practically allow fluctuation of the temperature within a total range of 13°, or 6½° to either side of the set point temperature. The control system would then become operative in the control range of approximately 65° to 78°. Such a system may be particularly useful in certain areas as a result of governmental standards which dictate a maximum temperature condition during the heating season and minimum temperatures in the cooling seasons in certain public or other multiple unit buildings. Further, it may be desirable to vary the dead band temperature at which heating terminates below the maximum level during night time hours as related to daytime hours. Similarly, it may be desired to adjust the upper cooling limit during certain times of the day.

Although various dual thermostatic devices are available, the controls generally permit crossover within any given range and do not have predetermined limit settings above which heating will not occur and below which cooling will not occur. Although sophisticated computer based controls for large building installations may permit corresponding sophisticated control including temperature limits, such systems are not economically significant for smaller installations and for individual control and selection.

There is therefore a significant need for a suitable automatic thermostatic control apparatus for adjusting heating and cooling equipment in accordance with the condition of the air within the conditioned space while limiting the heating and cooling equipment operation to establish predetermined maximum temperature limits during heating and cooling, and for optimum control permitting some adjustment of the range with respect to such conditions.

SUMMARY OF THE PRESENT INVENTION

The present invention is particularly directed to a dual thermostat apparatus generating fluid control signals in accordance with the temperature of the conditioned air in the conditioned space with means for automatically maintaining a predetermined maximum temperature during heating and minimum temperature during cooling without crossover of such temperature. In accordance with a further feature of the invention, the dual thermostat apparatus includes means for selectively adjusting a dead band range between such temperature limits. The dead band range preferably may span a range of from 0° F. to some predetermined maximum temperature differential. Generally in accordance with a preferred embodiment of the present invention, the apparatus includes a pair of thermostats. Each thermostat generates a fluid pressure signal proportional to temperature. The signals are applied to a signal comparator with a pressure limit response to one signal to establish an automatic switchover between the two control signals. The output of the comparator controls the separate heating and cooling devices. The signal comparator includes means to limit the operative level of one signal and thereby establish a reference or dead band pressure with automatic switchover to the other control signal in response to movement to the other of such pressure. The corresponding first signal thereby provides a control to one side of said reference signal and the opposite signal controls to the opposite side of such signal for reference. The signal switchover, however becomes operative only in accordance with the dead band setting. If the dead band setting is set to 0° F., the system will automatically switch over between heating and cooling at the referenced level in much the same manner as a conventional thermostat. However if a positive dead band range is introduced, a predetermined temperature difference exists before the signals reach the switching level and therefore become operative. A simple and reliable means of adjusting the dead band width is to provide an adjustment in the temperature sensing devices whereby the first and second pressure signal reach and cross the dead band pressure with respect to temperature are offset.

More particularly, in the preferred embodiment of the present invention, first and second matched leakport pressure sensors are used to generate the signals. Each sensor may include a signal orifice and a condition responsive bimetal element having one end aligned with the signal orifice to selectively open and close the orifice and thereby generate a back pressure signal linearly related to the positioning of the bimetal element and therefor the temperature. The backpressure sensors are connected to a supply, with each of the sensors being connected in series with a signal chamber of a duplex relay for signalling the heating source and the cooling source. A pressure regulator is connected in series with at least one of the sensors to supply and establishes the predetermined reference or crossover signal pressure at which the signals become operative. For example, in a practical embodiment, the pressure regulator is connected in series with the heating control channel of the system. The pressure regulator establishes a maximum pressure level in the corresponding signal chamber of the duplex relay. The pressure regulator may be a diaphragm operated leakport unit having a chamber with an input connected to supply and an output connected to the duplex relay. A spring-loaded diaphragm closes an exhaust orifice until such time as the back pressure in the chamber rises above a preset level. The back pressure then moves the diaphragm to exhaust air and thereby establishes and maintains such regulated pressure as the maximum. The regulator may be provided with an adjustable means to permit selection of the reference pressure level in accordance with the pressure requirement of the system components. The duplex relay controls a suitable signalling means such as an on-off switching means for supplying a proportional pressure signal to an output line connected to separate pneumatic operators of the heating source and the cooling source. The bimetal element includes a mounting including an adjustment means to preset the positioning of the bimetal element with respect to the orifice for any given reference temperature and thereby setting the back pressure signal from a particular reference position. The adjustable means of the pair of sensors are preferably interconnected to provide simultaneous and opposite readjustment with respect to the reference pressures. The position of the elements preset the required temperature related movement before the operative backpressure signal is established and thus defines the dead band region as more fully developed hereinafter. Depending upon the dead band range setting, the maximum pressure is created at the selected maximum heating temperature. Thereafter, even though the heating thermostat may tend to develop a greater back pressure signal, the regulator limits the pressure and the temperature is maintained at the maximum selection. As the temperature within the conditioned space continues to rise, no action is taken until the cooling sensor is repositioned to assume control. When the cooling limit is exceeded, the pressure developed by the cool thermostat increases above the reference or switch over level and establishes cooling of the air supplied to the conditioned space.

The present invention may be constructed using components which are well known in the art of pneumatic controls and the like and thus permit the application with known skills, components and technology. Further, the invention provides a simple system without necessity of complex signal processing, controls or the like which adapts the system to commercial production as well as to commercial installation and maintenance.

DESCRIPTION OF THE DRAWING FIGURES

The drawings furnished herewith illustrate a preferred construction of the present invention in which the above advantages and features are clearly disclosed as well as others which will be readily understood from the following description.

In the drawings:

FIG. 1 is a diagrammatic illustration of an air heating and cooling system including a dead band control structure in accordance with a preferred construction and embodiment of the invention;

FIG. 2 is a plan view of the thermostatic unit shown in FIG. 1;

FIG. 3 is a vertical section taken generally on line 3—3 of FIG. 2;

DESCRIPTION OF THE ILLUSTRATED EMBODIMENT

Figure 4:
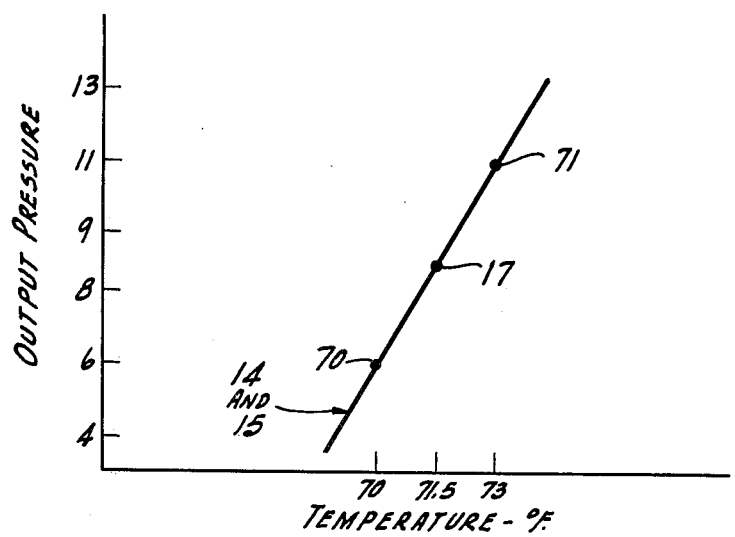
FIG. 4 is a graphical illustration showing the characteristic of separate heating and cooling thermostats and particularly the operating output signal pressure versus temperature.

Referring to the drawings and particularly to FIG. 1, a conditioned space 1 is shown having an air heating source 2 for supplying of heated air to the space. Heating source 2 is shown including a pneumatically operated valve 3 for selectively supplying a heating medium such as hot water to the heating source 1. Similarly, an air cooling source 4 is provided for supplying of cooled air to the space 1, and is connected to a supply of cooling medium such as chilled water by a pneumatically operated valve 5. The valves 3 and 5 may be generally similar diaphragm operated valve devices. Referring to valve 3, a pneumatic control chamber 6 includes a diaphragm 7 connected to open and close the valve. An input pressure signal is selectively supplied to the chamber 6, and simultaneously to chamber 6' of valve 5, from a main air supply or source 8 with the pressure proportional to the demand. Each of the illustrated valves 3 and 5 is normally fully closed or opened. Each valve 3 and 5 is also preferably selected to operate or respond with a proportional opening or closing to a selected pressure range, with the ranges for the valves being spaced from each other. Only one of the valves is therefore operated at any given time to either heat or cool the air supplied to the conditioned space depending upon the demand requirements. In the illustrated embodiment valve 3 is shown as normally open and the cooling valve 5 is shown as normally closed. A dual thermostatic unit 9 is located in the conditioned space 1 and includes individual heating and cooling control input sections connected to establish a single operating output to valves 3 and 5. A unit 9 is shown in FIGS. 1–3, with certain components offset in FIG. 1 for clarity of illustration of such parts. In the illustrated embodiment of the invention, the thermostatic unit 9 includes a heat sensor 10 and a cool sensor 11. Each of the sensors shown and described is a similar direct acting temperature responsive device which develops a backpressure signal to a duplex relay 12, which in turn is interconnected to the operating air supply 8. A signal limit control unit 13 is connected to relay 12 to establish an automatic switchover pressure from heating to cooling and vice versa as a result of a continuous comparison of the output pressure signals from temperature responsive heat sensor 10 and cool sensor 11.

The present invention is particularly directed to the construction of the space temperature sensing means and the automatic switchover control means, and a preferred structure is shown and described. The heating and cooling sources, the duplex relay and related equipment may be of any desired construction and are only briefly described herein as required to a full and complete understanding of this invention.

Figure 5:
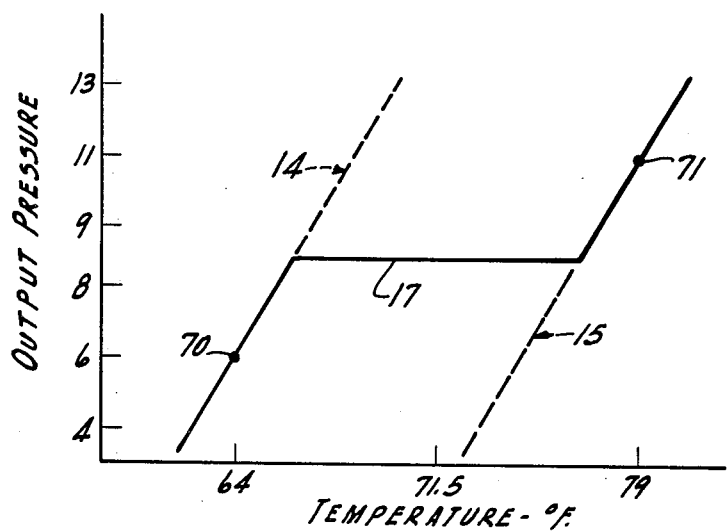
FIG. 5 is a similar graphical illustration showing an alternate dead band setting.

Each of the sensors 10 and 11 produces a linear temperature versus output pressure signals, as shown at 14 and 15 in FIGS. 4 and 5. The output pressure changes with temperature through the operating range of the valves 3 and 5 which as previously noted, have definite proportional operating pressure requirements. For example, heating valve 3 may require and operate only with a pressure in the range of 4 to 8 PSIG, and the cooling valve 5 only with a pressure in the range of 9 to 13 PSIG. Within each range a proportional opening and closing of the valve is generated. If the pressure is not within the corresponding range, the valve is either fully opened or closed. The thermostatic unit 9 includes a common control member 16 in this embodiment of the invention, which is coupled to the sensors 10 and 11 for adjustment or calibration of the temperature at which the switchover pressure of the limit control unit 13 is formed to thereby shift the outputs relative each other. The control member 16 shifts the response curves 14 and 15 and thereby the switchover temperatures and may effectively introduce a dead band temperature range 17; for example, as shown in FIG. 5 at the switchover pressure. Within the range 17, the output pressure of the heating sensor 10 is held fixed. The output pressure is above the proportional operating range of the valve 3 and the valve 3 is therefore held closed. The back pressure, and therefore the related output pressure of sensor 11 must rise to or above the regulated pressure which is below the range of the cooling valve 5, in order to generate an operative cooling signal. The space temperature thus drifts within the presettable dead band region 17 without heating or cooling and minimizes the energy consumption. However, if the temperature moves outside such range, the backpressure of either sensor 10 or 11 is operative to correspondingly operate either the heating source valve 3 or the cooling source valve 5 in accordance with the actual demand. Thus, the only control provided to the user is the manual control member 16 which permits only adjustment of the width of the dead band range 17. The crossover or switching temperature and pressure are factory adjusted or calibrated. The setpoint adjustment is made to encourage energy conservation. Thus, the automatic switchover eliminates the possibility of the control crossing over on either of the two temperature modes and wasting of energy as more fully developed hereinafter. The range may be selected with any desired limits and may, for example, practically provide ranges of from 0° F. to 15° F.

More particularly, the duplex relay 12 pressure comparator is similar to that shown in the U.S. Pat. No. 3,140,047 and is a stacked diaphragm unit which includes a supply chamber 18 connected to the air supply via an input line 19 and having connected to a single output line 20 for impressing of the output pressure on both chambers 6 and 6' of the heating valve 3 and the cooling valve 5. A flapper valve unit 21 is shown closing a valved connection or opening between the supply chamber 18 and the output chamber 22. A valve operator 23 is coupled to a plurality of stacked diaphragms 24 and 25 defining a heat signal chamber 26 and an exhaust chamber 27. A cool signal chamber 28 is defined by a diaphragm 29 forming a common wall to the heat chamber 26 and an outer cover wall. Diaphragm 29 is movable into operative engagement with the operator 23. The operator 23 includes a stem 30 which extends through the valved opening, with an exhaust passageway 31 within the stem coupling the output chamber 18 to the exhaust chamber 27. A coil spring 33 in the output chamber urges the operator 23 outwardly into spaced relation to the flapper valve unit 21. If the signal in either the heat or cool signal chamber 26 or 28 rises to an appropriate level, the corresponding diaphragm moves the operator 23 into engagement with the valve unit 21, which closes the exhaust passageway 31 and opens the valve unit 21 to transmit the supply pressure to the signal line 20 and thus the output or actuator control chamber 6 and 6'. The level of the signal transmitted is proportional to the pressure in the signal chambers and effective areas in the signal and output chambers of the valve unit. The opening is of course controlled by the pressure signals in the heat signal chamber 26 or the cool signal chamber 28, relative to the force of spring 33 and the output pressure. The signal levels are in turn controlled by the position of the sensors 10 and 11 and regulator 13.

In the illustrated embodiment of the present invention, the control unit 13 is a pressure regulator interconnected between the signal supply 8 and the heat input section or signal chamber 26 of the duplex relay 12 to limit the output pressure signal which can be generated by the temperature responsive sensor 10. As more fully developed hereinafter, this results in the automatic switchover from heating to cooling at predetermined temperatures, and with a preselectable dead band temperature range, such as shown by the characteristic in FIGS. 4 and 5.

The pressure regulator 13 is shown as a diaphragm unit having a base or body portion 34 with an inlet passageway 35 connected to the air supply 8 in series with a pin valve 36. The body portion includes an annular chamber 37 connected to passageway 35 and to an output passageway 38 which is connected to the heat signal chamber 26 of the duplex relay 12 via a connecting line 39. An exhaust orifice 40 is located centrally of the annular chamber 37 and connected by an exhuast passageway surrounding ambient, as shown by ground symbol 41. A diaphragm 42 is secured or clamped to the body 35 overlying the chamber 37 and the orifice 40 by an annular clamping plate 43 which is bolted to the body. A bias coil spring 44 is mounted within a threaded opening in the plate 43 and compressed between an outer adjustment screw 45 and the back side of the diaphragm. Suitable guide abuttments are provided on the adjustment plug 45 and a diaphragm guide button 46 located to the back side of the diaphragm 42. The diaphragm 42 is urged into sealing engagement overlying the exhaust orifice 40, with the annular portion defining one wall of the chamber 37 and thus subject to the pressure therein. With the orifice 42 closed, pressure is passed directly from the supply passage 35 to the outlet passage 38 and thus into heat signal chamber 26 via passageway 38 of duplex relay 12. The chamber 26 is also connected to temperature sensor 10. As the sensor 10 closes, as hereinafter described, the pressure in the signal chamber 26 and in the regulator pressure chamber 37 increases. At a predetermined pressure, depending upon the compression or setting of the coil spring 44, the pressure is sufficient to move the diaphragm from the exhaust orifice 40 and prevent any further increase. Thus the orifice 40 is selectively opened to exhaust the air from the regulating chamber and establishes the maximum back pressure signal which can be created regardless of the positioning of sensor 10. This pressure is selected to permit creation of at least the operating pressure of the heating valve unit 3. As the temperature in the conditioned space increases, the cooling back pressure sensor 11 closes to increase the back pressure signal in the cool signal chamber 28 of the duplex relay 12. At a selected temperature, dependent on the dead band selection, the pressure in chamber 28 exceeds the regulated pressure in chamber 26 and the diaphragm 29 moves into controlling engagement with the operator 31. The pressure has then moved into the operating range of the cooling valve unit 5 and the output pressure is operable to open the valve and cool the conditioned air supplied to the conditioned space. Thus, the system operates to selectively heat and cool the air within the limits established by the thermostatic unit 9.

The thermostatic sensors 10 and 11 are shown similarly constructed and each includes a leakport nozzle or orifice 48 and 49 connected to the supply air in series with the corresponding signal chambers 26 and 28 of the duplex relay 12, and each selectively closed by a bimetal element 50 and 51. Referring to the temperature sensor 10, the leakport orifice 48 is coupled to the duplex signal chamber 26 by a connecting line 52. The signal chamber 26 in turn is connected to the supply 8 in series with the pressure regulator 13. Pin valve 36 is shown connected in the connection of supply 8 to the pressure regulator 13. The cooling sensor 11 includes the similar leakport orifice 49 which is coupled through the cool signal chamber 28 directly to the supply 8. A pin valve 53 is also provided in the latter connection. The pressure supplied to the cool signal chamber 28 and to the cooling sensor orifice 49 is not therefore limited as in the heating control channel.

The illustrated thermostatic sensors 10 and 11 are similarly cantilevered leaf spring structures mounted to a common base plate 54. As shown in FIGS. 2 and 3, the base plate 54 may be channel-shaped member with the relay and regulator as well as an input/output connector mounted therein. Sensor 10 is described in detail with the corresponding elements of sensor 11 identified by the same primed number.

A bimetal leaf spring unit includes a strip-like support arm 55 with the bimetal element 50 secured to the outer end. A U-shaped support spring 56 opens longitudinally of the extension of the support arm. The end of one arm of the U-shaped support spring 56 is secured to the base plate 54 as at 57 and the opposite end is secured to an intermediate point of the base mounting strip 55 as at 58 to locate the bimetal element 50 in overlying alignment with the leakport nozzle 48. The bimetal element 50 as is well known, deflects with temperature with respect to the support arm. The element 50 is selected in the illustrated embodiment of the invention to move toward the leakport unit 48 with increasing temperature to thereby close the orifice 48 and increase the back pressure signal, as previously described. The temperature at which the unit moves into any particular position with respect to the nozzle orifice 48 is of course determined by the original setting of the leaf spring unit with respect to the nozzle. In the illustrated embodiment of the invention, the outer end of the mounting arm 55 extends in the opposite direction from the mounting connection 58 and is coupled to a dead band cam positioning unit 59. In the illustrated embodiment of the invention, a spiral cam 60 is rotatably mounted by a shaft 61 in suitable brackets 62 and 62' on the support plate 54 beneath the outer end of arm 55. A coupling screw 63 is adjustably secured in the outer end of the arm 55 and extends downwardly into bearing engagement with the periphery spiral cam 60. Rotation of the cam 60 varies the angular positioning of the arm 55 and therefore the bimetal element 50 with respect to the leakport nozzle 48 in accordance with well known construction. The cam shaft 61 is connected to the dead band input dial member 16 for presetting of the spacing of the bimetal element 50 from orifice 48 at a selected set point temperature.

In addition, in the illustrated embodiment of the invention, a common fluid signal feedback motor 64 is provided and coupled to the U-shaped mounting arms 55 and 55' of the support springs 56 and 56'. Feedback motor 64 is connected to the output signal line 20. The signal pressure is transmitted back to the motor 64 which includes a movable diaphragm 64a which is positioned in accordance with the level of the signal pressure. A pivot lever 65 is secured on a suitable offset portion of the mounting base plate 54 and overlies the diaphragm 64a. A feedback plate 66 is pivoted to the cam brackets at one end and extend beneath arms 55 and 55' with the outermost end bent upwardly into engagement with the arms. A coupling screw and bracket unit 67 is adjustably located along the length of the plate 66 and extends into engagement with the lever 65. Thus, a feedback pressure signal is applied as a negative feedback pressure signal to the bimetal arms 55 and 55' to reposition the bimetal elements 50 and 51 and establish a stable and accurate control even at low sensitivities.

The cooling thermostatic unit 11 as noted above is similarly constructed with a support arm 55' for the outer bimetal element 51. The outer end of arm 55' is also located in alignment with a spiral cam 69 and coupled thereto by an adjustment screw unit. The spiral cam 69 is fixed to the common shaft 61 and simultaneously positioned by rotation of the dead band dial 16.

In the illustrated embodiment of the invention, the spiral cams 60 and 69 are oriented and fixed on the shaft 61 to oppositely position the adjacent ends of the support arms 55 and 55' and thereby oppositely position the bimetal elements 50 and 51 relative to the related orifices 48 and 49. The illustrated cam system is particularly designed for the direct acting bimetal elements and illustrated pneumatic system. Thus, in the illustrated embodiment of the invention the arm 55' of cooling sensor 11 is shown essentially at its highest position while the arm 55 of heating sensor 10 is shown at its lowest position. Correspondingly, the opposite ends of the laminated elements are reversely located, with the heating unit bimetal element 50 closely spaced to its orifice 48 while the cooling bimetal element 51 is significantly spaced from its orifice 49. Thus, as the temperature increases, the bimetal elements 50 and 51 correspondingly move toward the nozzle orifices 48 and 49.

The heating sensor 10 closes within its set point range to vary the back pressure signal and generate the necessary output pressure signal to operate valve 3. The cooling sensor 11, as a result of the greater spacing, does not operatively close the orifice 49 until a substantial greater temperature then operates to create a varying back pressure signal which generates to output pressure to operate valve 5. The bimetal elements 50 and 51 may be adjusted through dial 16 to change the setpoint distance from the corresponding nozzle or orifices 48 and 49 to move from a zero dead band range to a maximum dead band range, as presently described.

Referring particularly to FIGS. 4 and 5, typical response characteristic of the illustrated system is illustrated for a heating valve 3 having an operating range of 4–8 PSI signal pressure and a cooling valve 5 having an operating range of 9–13 PSI signal pressure. The characteristic is illustrated for a system having a switch over pressure of 8.5 PSI. The output of the heat sensor bimetal element 50 versus the output pressure signal is shown by characteristic 14, and its intersection with the switch over pressure line 17 defines one limit of the dead band range. Similarly, the output of the cooling sensor bimetal element 51 versus the output pressure signal is shown by the characteristic 15 and its intersection with line 17 defines the opposite limit of the dead band range.

The scope or change per unit temperature change of the output characteristics are, of course, also dependent upon the sensitivity of the sensors 3 and 5. The sensitivity of the sensors is generally identical and may typically be adjustable in a range from 1–3 PSI/°F. A change in sensitivity changes the slope of characteristic and may therefore slightly change the dead band range. FIGS. 4 and 5 are given therefore sensitivity of approximately 2½ PSI/°F.

The dial 16 may be rotated to provide a zero (0) dead band range, as shown in FIG. 4. The bimetal elements 50 and 51 are then shifted such that the effective movements with respect to the orifices superimpose the linear characteristic 14 and 15 with similar back pressure over the total temperature range. In FIG. 4, the characteristics are superimposed. The regulator 13 is set for a pressure of 8.5 PSI and the characteristics intercept such pressure line at 71.5° F. at 71.5° F., the heating valve 3 is held closed. The cooling valve 5 is in the normal closed state because the pressure has not reached such level. Thus, the system has a 2° set point band with a 0° F. dead band range 17. Thus, if the temperature decreases below the selected setpoint heat level for sensor 10, the heating bimetal element 50 moves from its nozzle 48 and decreases the backpressure signal in the heat signal chamber 26. The heat chamber diaphragm 25 moves upwardly in FIG. 1 and thereby repositions the operator 23 to decrease the output pressure signal along its characteristic 14. As the output pressure signal moves into the 4–8 PSI operating range of the heating valve 3, the pneumatic actuator 6 is operative to proportionately open and close the valve 3 to properly heat the air supplied to the conditioned space.

The cooling sensor 11 similarly responds by closing the nozzle or orifice 49 as the temperature increases. If the temperature changes above the limit temperature, indicating demand for cooling, the cooling bimetal element 51 continues to move to close its nozzle 19 and increases the pressure level in the cool signal chamber 28. When the cool pressure level rises above the pressure in the heat signal chamber 26, which is limited to a maximum level by the regulator 13, the cooling signal pressure in the cool signal chamber 28 becomes operative to position the duplex relay operator 23 and the output pressure increases along the characteristic line 15 for operating the cooling valve 5. The increased pressure opens the valve 5 and thereby cools the air supplied to the conditioned space.

Thus, with the characteristic superimposed, the control is operative to reposition the operator to increase and decrease the output pressure signal and provide operation of the heating and cooling valve. At 71.5° F. the heating and cooling valves are both closed and at 71.5° F. there is an automatic switchover between heating to cooling in response to any change in temperature. The unit is now functioning as a conventional single element thermostat. The output characteristics 14 and 15 may be shifted along the switchover pressure line by respositioning of the bimetal element cams 60 and 69, and the extent of the dead band range of the system characteristic correspondingly controlled. Thus, the output pressure established by the heating sensor 10 for any given temperature changes as the cam dial 16 is rotated to reposition the support arm for the bimetal element 50. Similarly, for any given pressure, the required temperature to deflect the bimetal 50 to create such pressure changes with the change in the position of the cam dial 16 and cam 60. The cooling sensor is similarly but oppositely positioned. For reference purposes, calibration may be with respect to any given position on the characteristic. The midpoint 70 and 71 of the throttle range provides a convenient selection if the temperature change for a given pressure is used. The width of this dead band range 17 is created directly by the shifting and the resetting of the reference position of thermostatic bimetal elements 50 and 51, such that the heating sensor 10 now creates the maximum pressure prior to the maximum set point temperature while the cooling thermostatic sensor 11 creates an operator or controlling signal only at or after the maximum set point temperature.

Assuming the dial has been rotated to locate the heating curve mid-point at 64° F. and the cooling curve midpoint at 79° or a total of 15° F. This shifts the curves as shown and establishes intersection with the switch over pressure line at approximately 65° F. and 78° F. respectively. This creates a dead band of substantially 13° F. The response to the opposite sides of the dead band range is similar to that previously described. Thus, as the temperature increases through the heating zone, the valve 3 is modulated to slowly close and as the dead band range is approached, closes to establish the dead band state. If the temperature increases, the cooling sensor 11 continues to close as a result of the deflection of its bimetal element and the pressure in the cool signal chamber 28 continues to increase. The increase in temperature thus results in a corresponding greater pressure in the cool signal chamber 28 from 65° F., to 78° F., the pressure increases but does not rise above the heat signal chamber 26 until the 78° F. The cool signal pressure then first becomes operative to establish a corresponding respositioning of the duplex relay operator 23 to further increase the output pressure at the output operating line 20. Cooling of the air occurs as the temperature tends to rise above the minimum cooling temperature which is defined by the intercept of the cooling signal characteristic 15 with the maximum pressure reference line 17, with the slight delay introduced by the separation of the operating pressure level for valve 6 from the crossover pressure line 17.

The present invention thus provides an automatic thermostatic control apparatus for adjusting heating and cooling equipment in accordance with the condition of the air within the conditioned space with means for limiting the heating and cooling equipment operation to establish predetermined maximum temperature limits during heating and cooling, and for optimum control permitting limited adjustment of the range with respect to such conditions. The dual thermostatic apparatus automatically maintains predetermined maximum temperature conditions without crossover of the operating devices with temperature. The components necessary to carry out the invention are of the type known in the art of pneumatic controls for heating and cooling systems. The control system is therefore particularly adapted to commercial installation and maintenance.

Various modes in carrying out the invention are contemplated as being within the scope of the following claims, particularly pointing out and distinctly claiming the subject matter which is regarded as the invention.

We claim:

1. A dual thermostatic control apparatus for actuating a heating and cooling apparatus to condition air in a conditioned space, comprising temperature responsive means establishing first and second varying level signals having a level which changes over a signal range with changes in temperature, signal limit means to limit the first of said signals to a selected maximum reference level within said signal range, means coupled to said temperature responsive means and to said signal limit means to compare the level of said signals and establishing an output signal for operating said heating and cooling apparatus and providing heating when one of said signals is to one side of said reference level and cooling when the other of said signals is to the other side of said reference level to produce an automatic switchover between cooling and heating in accordance with the relative level of said signals with respect to said reference level.

2. The dual control apparatus of claim 1 including an adjustable control means connected to said temperature responsive means to adjust the temperature at which said first and second signals equal said reference level and thereby establish a dead band in which neither heating or cooling of the air is provided.

3. The dual control apparatus of claim 2 wherein said temperature responsive means includes first and second matched thermostats having corresponding and linear temperature versus pressure signal characteristic, said reference level being a pressure level.

4. The dual control apparatus of claim 3 wherein said control means is connected to said thermostats to shift said characteristics and thereby adjust the dead band within a selected maximum range.

5. The dual control apparatus of claim 3 having a common sensitivity adjustment means connected to said thermostats.

6. A dual thermostatic control apparatus for actuating a heating source and a cooling source to condition the air to be supplied to a conditioned space, comprising first temperature responsive unit establishing a first fluid pressure signal varying in level in accordance with temperature, a second temperature responsive unit establishing a second fluid pressure signal varying in level in accordance with temperature, a pressure signal comparator unit connected to said first and second temperature responsive units and having an output pressure signal established in accordance with the higher value of said fluid pressure signals, said output pressure signal being selected for selective actuation of said heating source and said cooling source, a pressure limit means connected to limit the signal level of said first temperature responsive unit to a selected maximum reference pressure level within the range of said first and second temperature responsive units and establishing an automatic switchover pressure level at which the first and second temperature responsive units are operative and at which said heating source and said cooling source are actuated.

7. The control apparatus of claim 6 wherein said limit means is an adjustable pressure regulator connected to limit said first signal pressure to a selected maximum level.

8. The dual thermostatic control apparatus of claim 7, wherein said pressure regulator is a leakport unit including a coupling chamber connected to said comparator and to supply and having an exhaust orifice within the chamber and a closure member resiliently biased to close said orifice whereby said closure member selectively opens to establish a maximum pressure to said comparator.

9. The apparatus of claim 8 wherein said closure member is a diaphragm element forming a wall of said coupling chamber, and having a spring member coupled to the diaphragm to urge the diaphragm to close said exhaust orifice, and an adjustment means for adjusting the force of said spring.

10. The control apparatus of claim 6 wherein said temperature responsive unit is constructed and calibrated to establish a pressure above said reference level at a selected reference temperature, said second temperature responsive unit is constructed and calibrated to establish a pressure below said reference level at said selected reference temperature.

11. The apparatus of claim 6 including an adjustable control unit connected to said first and second temperature responsive units for adjusting the temperature response characteristic and thereby the temperature at which said reference pressure is created and thereby establishing anyone of a plurality of selected dead band ranges within which both sources are off.

12. The apparatus of claim 11 wherein said first and second temperature responsive units having corresponding linear temperature versus pressure characteristic.

13. The apparatus of claim 11 wherein said temperature responsive units are leakport units having bimetal lid elements, and said control unit includes cam means coupled to change the operative positions of the lid element and thereby operable to adjust the dead band range.

14. The dual control apparatus of claim 11 wherein each of said first and second temperature responsive units includes a leakport unit and a bimetal element mounted in overlying relationship to selectively close the corresponding leakport unit, said control unit is connected to adjust the position of the bimetal elements, said signal comparator including first and second signal chambers having movable wall means therebetween and said first signal chamber being connected in series with said first leakport unit, said second signal chamber being connected in series with said second leakport unit.

15. The apparatus of claim 14 wherein a single supply is connected to said leakport units and to said sources, and said limit means is in series with said first signal chamber and said supply.

16. A dual thermostatic control apparatus for establishing a variable pressure signal for proportionally operating a heating device operating in a first pressure range and a cooling device operable in a second different pressure range, comprising a common output line adapted to supply operating air pressure to said heating and cooling devices, a first pressure sensor establishing a first pressure signal varying linearly with temperature, a second pressure sensor establishing a second pressure signal varying linearly with temperature, a pneumatic relay having an operating control valve unit having an operating pressure input means for selectively connecting pressure to said output line, said relay having pressure comparing means including first and second chambers separated by a common movable wall, said first and second chambers being connected to said first and second sensors and having a valve operator connected to said movable wall and proportionally moved in accordance with the higher pressure in said chambers for corresponding positioning of said valve unit, a pressure regulator connected to limit the pressure signal from the one sensor to said corresponding chamber to a selected switchover pressure, said sensors each including calibration means for adjusting the position of the temperature response characteristic relative to each other and to said switchover pressure, and a common control means coupled to said calibration means to simultaneously and oppositely position the calibration means.

17. The apparatus of claim 16 wherein each of said sensors is a leakport unit having a signal nozzle and a cantilevered arm including a bimetal strip mounted to selectively close said nozzle, and said calibration means includes adjustable support means to selectively position said arm relative to the nozzle to adjust the gap between the nozzle and bimetal strip.

18. The apparatus of claim 17 wherein said adjustable support means is a cam movable relative to the arm for positioning the arm.

* * * * *